United States Patent [19]

Jacob

[11] Patent Number: 5,776,211
[45] Date of Patent: Jul. 7, 1998

[54] JACKTOP CLEANER

[75] Inventor: Jon Kent Jacob, Abington, Mass.

[73] Assignee: Abington, Inc., North Abington, Mass.

[21] Appl. No.: 837,567

[22] Filed: Apr. 21, 1997

[51] Int. Cl.$^6$ .................................................... B01D 46/00
[52] U.S. Cl. .............................. 55/356; 55/433; 55/478; 55/480
[58] Field of Search .......................... 55/337, 356, 357, 55/432, 433, 467, 478, 480, 481, 493, 502

[56] References Cited

U.S. PATENT DOCUMENTS

| | | |
|---|---|---|
| 759,411 | 5/1904 | Baker . |
| 911,827 | 2/1909 | Low . |
| 2,507,672 | 5/1950 | McAllister . |
| 3,046,718 | 7/1962 | Ide et al. . |
| 3,628,213 | 12/1971 | Ramo . |
| 3,858,272 | 1/1975 | Bard et al. ............................ 55/357 |
| 4,036,613 | 7/1977 | Brown et al. . |
| 4,157,964 | 6/1979 | Rishel . |
| 4,193,161 | 3/1980 | Scott . |
| 4,671,873 | 6/1987 | Keller . |
| 4,681,609 | 7/1987 | Howeth . |
| 4,723,971 | 2/1988 | Caldas .............................. 55/357 |
| 4,767,427 | 8/1988 | Barabas et al. . |
| 4,810,270 | 3/1989 | Terry et al. . |
| 4,828,187 | 5/1989 | Davis et al. ........................ 55/356 |
| 5,066,315 | 11/1991 | Haberl et al. ...................... 55/432 |
| 5,089,037 | 2/1992 | Marsolais ........................... 55/357 |
| 5,141,541 | 8/1992 | Buckingham . |
| 5,173,987 | 12/1992 | Buckingham . |

FOREIGN PATENT DOCUMENTS 671601   5/1952   United Kingdom .

Primary Examiner—Jay H. Woo
Assistant Examiner—Minh-Chau T. Pham
Attorney, Agent, or Firm—Cort Flint; Henry S. Jaudon

[57] ABSTRACT

A vacuum waste removal system including a waste receiving container including a tank having an intake conduit, a dome carrying an air knife and having an outlet conduit and a filter screen removably located between an upper end of the tank and a lower end of the dome. The improvement is directed to a lift and lock arrangement interconnecting the dome with the tank. The arrangement includes a horizontal arm extending from one edge of the dome and tank to substantially the vertical axis of the container. A jack is connected with the first end of the arm while the second end connects with the dome and air knife. A conduit supplying air to the air knife passes through the connector connecting the dome with the end of the arm. The arrangement allows the dome, the conduit, and the air knife to be moved upward away from the tank a distance sufficient to allow removal and replacement of the filter. The arrangement then allows the dome, conduit and air knife to be cranked downwardly into sealed engagement with the tank. During these vertical movements, the dome is maintained aligned with the vertical axis of the cylinder.

14 Claims, 2 Drawing Sheets

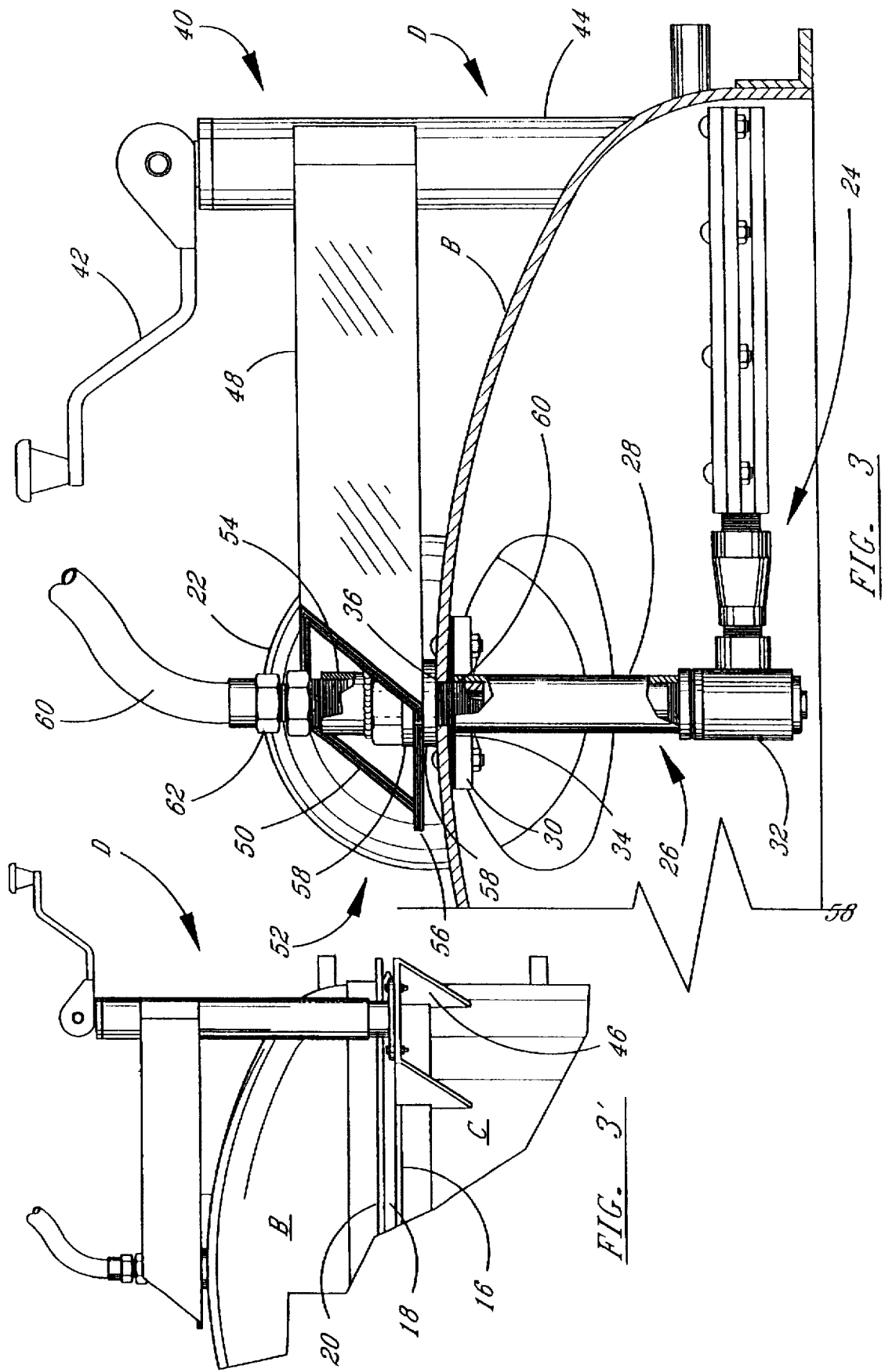

5,776,211

1
JACKTOP CLEANER

BACKGROUND OF THE INVENTION

The instant invention is directed to an improvement in an industrial cleaning arrangement, particularly the manner in which the dome of an accumulating cylinder is controlled relative to the tank.

In vacuum cleaning systems for industrial use it is well known to locate screens between the tank and dome and to provide cleaning jets or air knives which operate between waste removal cycles as is illustrated by prior U.S. Pat. No. 5,141,541. This prior patent also recognizes the problem created by the necessity of removing and replacing the screens at various intervals due to their becoming clogged with oil, lint, and other debris which accumulates over time. The frequency of these screen changes varies upon the quantity of waste extracted and removed from the fiber product. Failure to maintain the system with an unclogged screen results in inefficiency in the lint and dust removal process and, in some instances, with equipment damage.

The major problem involved in changing the screen is down time and labor, both brought about by the huge size and weight of receiving equipment which weighs in the range of 600 or 700 lbs. This situation is magnified by the fact that the accumulating cylinder operates in a suspended position.

U.S. Pat. No. 5,141,541, which is assigned to Abington, Inc. as is the instant application, was an initial attempt to remedy this problem by providing jack levers at spaced locations about the accumulating cylinder. These devices were effective in lifting the dome and maintaining it aligned with the vertical axis of the cylinder so that an air tight seal is obtained between the dome and the tank when the two are united. The drawback with this arrangement is the requirement that it requires two people working in consort to effectively lift the dome to remove the screen. Re-seating the dome requires the same procedure in reverse. During the reseating operation, it is essential that the edges of the dome remain aligned and parallel with the edges of the tank so that an air tight seal is formed when they come together.

Accordingly, it is an object of the instant invention to provide a lift and replace device for raising and lowering the dome of an industrial accumulating cylinder which is operated by a single person.

Another object of the invention is the provision of a lift and lock assembly for the dome of the lint and dust collection cylinder of an industrial cleaning arrangement which maintains the edges of the tank and dome aligned and parallel during the lifting and lowering operations.

Another object of the invention is a connection between the dome and lift arm which accommodates an air supply conduit for supplying air to the air knife located within the dome.

Another object of the invention is the provision of a locking system which effectively seals the dome with the filter screen and the accumulating tank of a lint and dust collection cylinder.

Another object of the invention is a connection between the dome and lift device which allows the dome to be maintained with its axis in the vertical position during lifting.

Another object of the invention is a swivel connection between the dome and the lift arm.

Another object of the invention is the provision of a lift and lock system for the dome of a dust and lint accumulating cylinder which is capable of accommodating the extreme weight of the dome with a minimum of effort.

SUMMARY OF THE INVENTION

The invention is directed to an improvement in an industrial cleaning arrangement having a dust and lint accumulating cylinder comprising a tank having an intake, a removable dome having an outlet and a removable screen positioned between the dome and tank. A lock and lift unit is connected with the tank at one side thereof and with the top of the dome at a point along the vertical axis of the cylinder. The lock and lift unit is operative to separate the dome from the tank by lifting it along the vertical axis and to form an air tight seal between the dome and the tank by forcing it downward along the vertical axis into pressured contact with the periphery of the screen carried on the upper edge of the tank. A guide member may be mounted with the cylinder to maintain the dome aligned with the vertical axis during its ascending and descending movements.

The lock and lift unit includes a crank jack connected with a horizontal arm. A mounting stand is connected with the exterior of the tank adjacent its upper edge and the jack is secured to the stand. A swivel connection connects the horizontal arm at its opposite end with the dome.

A rotating air knife is carried by the dome within the cylinder. Compressed air is supplied to the air knife via a conduit arranged along the vertical axis of the cylinder between a supply line and the mounting structure for the air knife within the cylinder.

A plurality of hold down members are provided to assist in locking the flanges of the dome with the tank to insure a pressure seal which is air tight.

The invention includes a method of operating an industrial cleaning arrangement having a reservoir for accumulating dust, lint, and other fiber debris. The reservoir includes a tank having an air inlet and a dome having an air outlet. An air knife is carried by the dome. A filter screen is positioned between the tank and the dome in position to be cleaned by the air knife. The method is directed to separating the dome from the tank for facilitating removal and replacement of the filter screen and uniting the dome with the tank forming an airtight seal. The method compromises; providing a single lifting member and connecting the lifting member with the dome; causing the lifting member to move in a vertical direction while carrying the dome; and, causing the dome to move along the vertical axis of the reservoir while moving away from and into engagement with the tank.

The method further includes providing the lifting member comprise a crank jack having a horizontal arm and connecting an end of the arm with the dome by way of a swivel connection. The method further includes providing an air conduit along the vertical axis of the cylinder and supplying the air knife with compressed air through this conduit.

A vacuum waste removal system including a waste receiving container which includes a tank to which an intake conduit is connected and a dome including an air knife to which an outlet conduit is connected. A filter screen is removably located between an upper end of the tank and a lower end of the dome. A lift and lock arrangement is provided to move the dome relative to the tank while maintaining the dome aligned with the vertical axis of the tank. This arrangement includes a horizontal arm arranged over and connected with the dome along its vertical axis and a jack connected with one end of the arm. A connection for connecting the arm with the dome includes a conduit for supplying air through the dome to an air knife mounted within the dome. The connection also includes a swivel mounting between the dome and the arm which allows relative movement therebetween as the dome is cranked upward along the vertical axis a distance sufficient to allow removal the filter and cranked downwardly into engagement with the tank.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a cut-away sectional view of the interior of the dome and the connection of the lifting arm with the top of the dome; and FIG. 3' is a cut-away sectional side view of the accumulating cylinder showing the mounting structure for the jack and lifting arm.

DESCRIPTION OF A PREFERRED EMBODIMENT

Referring now in more detail to the drawings, the invention will now be described in more detail.

Figure 1:
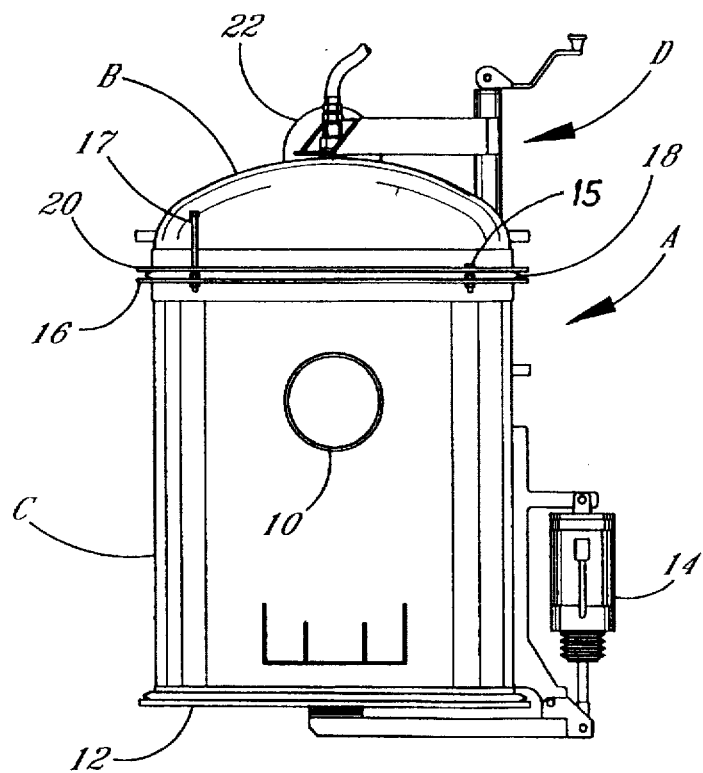
FIG. 1 is a side view of the accumulating cylinder with the dome, screen, and tank in operative engagement.
Figure 2:
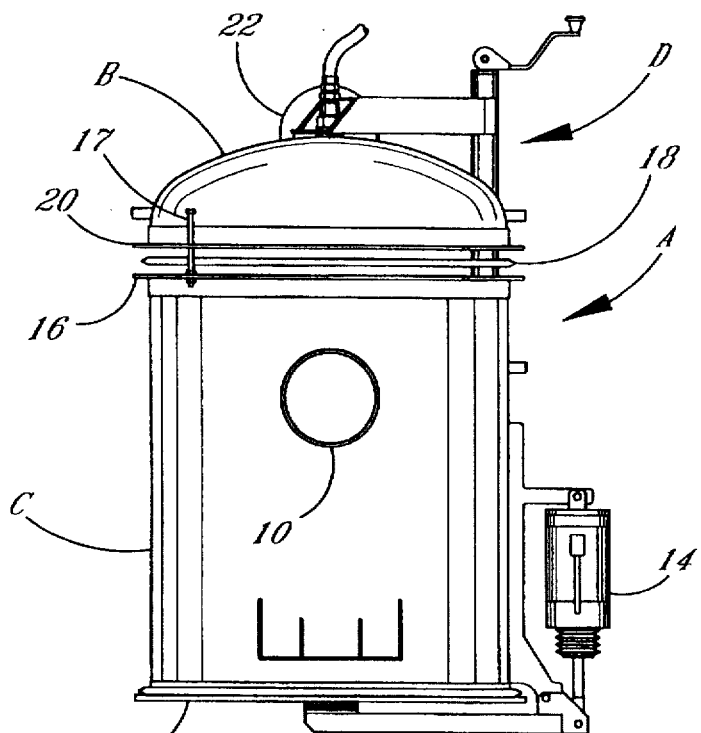
FIG. 2 is a side view similar to FIG. 1 with the dome shown elevated and separated from the tank with the screen positioned for removal.

FIGS. 1 and 2 show an industrial cleaning arrangement including a lint and dust accumulating cylinder A which, in operating condition is steel deck mounted in the usual manner (not shown). Accumulating cylinder A consists of lint and dust collecting tank C. which includes an intake duct 10, for receiving lint and dust drawn off at cleaning operations at spaced locations and transported via air ducts to cylinder A. There is a discharge door 12 which is controlled by pneumatic cylinder 14 between the closed operative position shown and an open discharge position which allows removal of the collected residue. Pneumatic cylinder 14 is controlled by a programmable controller which operates in sequence with the operating cycle of the cleaning system to discharge the collected waste during down time.

Arranged to sit on the upper flange or edge 16 of tank C is filter screen 18 which is formed with a desired porosity and fitted with an elastic gasket or seal about its periphery. Lower flange or edge 20 of dome B is aligned with upper edge 16 of the tank. In the operative position flanges or edges 16 and 20 engage and compress against a gasket formed about the periphery of filter screen 18 to form an air-tight seal. This structure, which does not form a part of the instant invention, is shown and described in more detail in prior U.S. Pat. No. 5,141,541, the disclosure of which is incorporated with the instant disclosure.

Dome B, which is formed with an exhaust outlet 22 and lower sealing edges 20, has a lift and lock arrangement D connected to its upper surface. Dome B carries an air knife 24 which is carried by mounting structure 26 connected with the inner surface of the dome along the vertical axis of cylinder A. Air knife 24 is generally described in U.S. Pat. No. 5,173,987 which is assigned to Abington, Inc. and whose disclosure is incorporated with the instant disclosure.

Mounting structure 26, as best seen in FIG. 3, includes a hollow weldment or tubing 28 which is secured with its upper end passing through an aperture 34 formed in plate 30. Preferably, tubing 28 is welded to plate 30. A rotary union 32, mounting air knife 24, is carried by the lower end of weldment 28. Plate 30 is secured by suitable means, such as nuts and bolts, with the inside surface of dome B in position to locate weldment 28 aligned with opening 36 formed along the longitudinal axis of cylinder A. A washer seals the connection between plate 30 and the inner surface of dome B. Threads are cut in the inner surface of weldment 28 at its upper end.

Mounting structure 26 is rigidly formed with dome B providing that air knife 24 is maintained along a horizontal plane as it is rotated about weldment 28 above screen 18 as it functions to prevent the accumulated lint and dust thereon.

Lift and lock arrangement D includes a rotary jack 40, which includes an outer casing 44 located about an inner mounting stem and provided with a crank screw and crank handle 42, as shown in FIG. 3, 3'. By rotating handle 42, casing 44 is caused to move vertically along the inner mounting which also functions to maintain casing 44 vertical.

Jack 40 is commercially available and does not form a part of the invention.

Platform 46, as seen in FIG. 3', is welded to tank C adjacent upper edge 16. Jack 40 is secured to platform 46 by any suitable means, and is arranged to extend vertically and parallel with the central axis of cylinder A. Lift arm 48 is connected at one end with casing 44 to extend over the upper surface of dome B. Lift arm 48 is constructed as a four-sided hollow member with its opposite end 50 cut at approximately 45°, as shown in FIG. 3, to provide for connector 52 which connects lower face 56 of arm 48 with dome B and mounting structure 26.

Connector 52 comprises a hexhead machine screw 54 formed with a central bore which passes completely through. At least the upper portion of this bore is threaded. Screw 54 passes through an opening in face 56 and through opening 36 in dome B and screws into the upper end of weldment 28 forming a rigid extension of the weldment. A pair of swivel washers 58 are arranged about screw 54 above and below each surface of face 56. The swivel washers allow limited relative movement between arm 48 and screw 54 carrying dome B. This movement allows dome B to be maintained with its vertical axis aligned with the vertical axis of the cylinder even should arm 48 be slightly deflected away from horizontal during lifting and supporting of the dome.

Supply conduit 60 is connected with the bore formed in hexhead screw 54 by connectors 62 which screw into engagement therewith. The continuous conduit formed through connectors 62, screw 54, and weldment 28 provide a passageway for the delivery of compressed air to air knife 24 from supply conduit 60.

To insure that edges 16 and 20 of dome B and tank C remain always aligned, a guide spindle 17 may be connected with one of the flanges or edges 16 and 20 while passing through an aligned aperture in the opposite flange. During vertical movement of dome B, flange 16 or 20 slides along spindle 17 which further maintains its axial position relative to tank C.

Aligned apertures arranged about flanges 16 and 20 may serve as additional sealing members if necessary. Bolts may be passed through these apertures to further assist in forming an air tight seal between members B and C as indicated in FIG. 1.

In operation, a single operator simply removes the reinforcing bolts 15 and rotates crank 42 to lift dome B from tank C. The actual distance is between 3 and 6 inches. Mounting structure 26 carrying air knife 24 is maintained vertically aligned by swivel washers 58 while guide pin 17 maintains dome B and tank C aligned. When flanges 16 and 20 are sufficiently separated, screen 18 is removed and replaced. Crank 42 is then rotated in the reverse direction bringing dome B back into position on tank C. Crank 42 positively forces arm 48 against the dome with sufficient downward force to bring about an air tight seal between flanges 16 and 20 and the resilient flange about screen 18.

While a preferred embodiment of the invention has been described using specific terms, such description is for illustrative purposes only, and it is to be understood that changes and variations may be made without departing from the spirit or scope of the following claims.

What is claimed is:

1. In an industrial cleaning arrangement having a dust and lint collection cylinder including a tank having an air intake, a removable dome having an air outlet and a screen removably located between an outer edge of said dome and an upper edge of said tank, said arrangement comprising;

a lock and lift unit connecting with said tank at a point along the periphery thereof and with said dome at a point aligned with the vertical axis of said cylinder, said unit being operative to separate said dome from said tank by lifting said dome along said vertical axis and to seal said dome with said tank by moving said dome downward along said vertical axis into pressured contact with said upper edge of said tank; whereby, said dome may be raised to allow removal of said screen and lowered into sealing engagement with said tank.

2. The arrangement of claim 1 including; a guide member associated with said cylinder, said guide member being operative to maintain said dome aligned with said tank during vertical movement.

3. The arrangement of claim 1; wherein said lock and lift unit includes a crank jack mounting a horizontal arm.

4. The arrangement of claim 3 including; a mounting stand connected with said periphery of said tank adjacent said upper edge, said crank jack being secured with said mounting stand.

5. The arrangement of claim 3 including; a connector including a swivel mounting connecting said horizontal arm with said dome.

6. The arrangement of claim 1 including; a rotating air knife carried within said dome.

7. The arrangement of claim 6 including; an air conduit passing through said dome along said vertical axis for supplying said air knife with compressed air.

8. The arrangement of claim 7 wherein; said lock and lift unit includes a horizontal arm and a connector connecting said arm with said dome, said air conduit passing through said connector.

9. The arrangement of claim 1 including; a plurality of sealing members, said sealing members being operative to lock opposed flanges of said tank and said dome in air tight engagement with the periphery of said screen.

10. In an industrial cleaning arrangement for accumulating dust and lint a reservoir having a vertical axis, said reservoir including a tank having an air inlet, a dome having an air outlet, an air knife carried by said dome and a filter screen positioned between said tank and said dome, a method of separating said dome from said tank for facilitating access to said filter screen and of reuniting said dome with said tank in sealed air tight engagement; said method comprising;

providing a substantially vertically disposed lifting member having a substantially horizontally disposed lifting arm;

providing a connector and connecting said connector with said lifting arm and with said dome along said vertical axis;

actuating said lifting member to move said connector vertically along said vertical axis; and moving said dome first upward along said vertical axis away from and out of engagement with said tank and moving said dome second downward along said vertical axis toward and into engagement with said tank.

11. The method of claim 10 including providing said lifting member include a crank jack.

12. The method of claim 10 including; providing a swivel connection between said lifting arm and said dome and allowing relative movement between said lifting arm and said dome during movement.

13. The method of claim 12 including; providing an air conduit through said connection along said vertical axis and supplying said air knife with compressed air through said conduit.

14. A vacuum waste receiving container including a tank having an intake conduit, a removable dome having an outlet conduit, a filter screen located between an upper edge of said tank and a lower edge of said dome, an air knife carried by said dome and an air supply for supplying air for said air knife, the improvement comprising;

a lock and lift arrangement interconnecting said dome with said tank, said lock and lift arrangement including an arm extending from a point along the periphery of said dome to substantially the vertical axis of said container, a jack connecting with a first end of said arm, a connector having a swivel member connecting said dome with a second end of said arm along said vertical axis and a conduit passing through said connector connecting said air supply with said air knife; whereby, said lock and lift arrangement acts to move said dome vertically between a raised position separated from said tank and a lowered position in engagement with said tank, to allow air from said supply to communicate with said air knife and to allow relative movement between said dome and said arm during said vertical movement.

\* \* \* \* \*